US011060864B1

(12) United States Patent
Ho

(10) Patent No.: US 11,060,864 B1
(45) Date of Patent: Jul. 13, 2021

(54) CONTROLLER FOR MEASURING DISTANCE FROM REFERENCE LOCATION AND REAL SIZE OF OBJECT USING A PLURALITY OF CAMERAS

(71) Applicant: Chi Fai Ho, Palo Alto, CA (US)

(72) Inventor: Chi Fai Ho, Palo Alto, CA (US)

(73) Assignee: TP Lab, Inc., Palo Alto, CA (US)

(*) Notice: Subject to any disclaimer, the term of this patent is extended or adjusted under 35 U.S.C. 154(b) by 81 days.

(21) Appl. No.: 16/254,581

(22) Filed: Jan. 22, 2019

(51) Int. Cl.
G01C 11/06 (2006.01)
H04N 5/247 (2006.01)
G01B 11/00 (2006.01)
G06T 7/70 (2017.01)
G01C 3/08 (2006.01)
G06T 7/55 (2017.01)

(52) U.S. Cl.
CPC ............ *G01C 11/06* (2013.01); *G01B 11/00* (2013.01); *G01C 3/08* (2013.01); *G06T 7/55* (2017.01); *G06T 7/70* (2017.01); *H04N 5/247* (2013.01)

(58) Field of Classification Search
CPC .. G01C 11/06; G01C 3/08; G06T 7/55; G06T 7/70; G01B 11/00; H04N 5/247
USPC ........................................................ 348/138
See application file for complete search history.

(56) References Cited

U.S. PATENT DOCUMENTS

2006/0187333 A1* 8/2006 Kobayashi ......... H04N 5/23267
348/333.01
2013/0208108 A1* 8/2013 Chang ..................... G01C 3/18
348/135
2019/0349572 A1* 11/2019 Uemori ................ G06K 9/6267

* cited by examiner

Primary Examiner — On S Mung
(74) Attorney, Agent, or Firm — North Shore Patents, P.C.

(57) ABSTRACT

A controller obtains a distance index associated with first and second cameras and a camera distance between the first and second cameras. The controller receives a first and second image captured by the first and second cameras, respectively. The first and second images include a first and second object image of an object, respectively. The controller calculates a first object distance between the first camera and the object using a distance index associated with the first and second cameras, the camera distance, the first object image, and the second object image. The controller calculates an object real size of the object using the first object distance, the second object image, the camera distance, and the distance index. The controller determines whether policy criteria are satisfied by the first object distance and/or the object real size. When satisfied, the controller performs an action associated with the criteria.

18 Claims, 11 Drawing Sheets

Synchronous Cameras 620 - Camera 420 & Camera 430

- Single Mounted Chassis
- Dual or Multiple Mounted Chassis
- Street Poles, freeway
- Smart phone / digital camera
- Car / Bus
- Drone
- Door, outdoor, Security Gate
- Gate, Toll booth, Check point
- TV set, Display Monitor, Mirror

CONTROLLER FOR MEASURING DISTANCE FROM REFERENCE LOCATION AND REAL SIZE OF OBJECT USING A PLURALITY OF CAMERAS

BACKGROUND OF THE INVENTION

Field

This invention relates generally to an image sensor controller, and more specifically, to a plurality of synchronous image sensors and a computing controller to measure distance of an object from a reference location and to calculate real world size the object using images of the object.

Related Art

There are a number of ways to determine a distance of an object from a reference location using captured data using a sensor. Traditional approaches include a light sensor, a sonar senor, or a radar. Such sensor sends out a sequence of signals and receives the signals reflected from an object. The sensor's controller then measures the time of flight the signals travel between sending and receiving, and calculates the distance of the object from the sensor based on the time of flight and the type of sensor. However, these techniques rely on the time of flight, which, when not feasible, prevents the distance from being determined. The data captured using these techniques further cannot be used to calculate the real world size of the object.

BRIEF SUMMARY OF THE INVENTION

Disclosed herein is a system for measuring distance between an object and a reference location and calculating a real size of the object using a plurality of cameras, and a corresponding method and a computer program product as specified in the independent claims. Embodiments of the present invention are given in the dependent claims. Embodiments of the present invention can be freely combined with each other if they are not mutually exclusive.

According to one embodiment of the present invention, the system includes a first camera and a second camera associated with a distance index. The first camera captures a first image that includes a first object image of an object. The second captures a second image that includes a second object image of the object. The second image is captured at approximately a same time as the first image. A controller obtains the distance index and a camera distance between the first camera and the second camera. The controller also receives the first image from the first camera and the second image from the second camera. The controller calculates a first object distance between the first camera and the object using the distance index, the camera distance, the first object image, and the second object image. The controller also calculates an object real size of the object using the first object distance, the second object image, the camera distance, and the distance index.

In one aspect of the present invention, the controller determines whether criteria of a policy are satisfied by at least the first object distance and/or the object real size. When the criteria of the policy are satisfied, the controller performs an action associated with the criteria.

BRIEF DESCRIPTION OF THE SEVERAL VIEWS OF THE FIGURES

FIG. 5 illustrates an exemplary embodiment of placement of synchronous cameras.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Embodiments of the invention provides an image sensor controller configured to determine a distance of an object from a reference location using two or more image sensors capturing pictures at approximately the same time. In addition, by capturing multiple sets of images at measured timestamps, the image sensor controller can be configured to compute the speeds of a moving object and its acceleration, or the speeds of a moving vehicle, on which the image sensors are placed, relative to the object. The image sensor controller can also be configured to calculate the real world size of the object using one or more captured images. The real world size of the object and the captured image of the object allows the object to be identified.

Figure 1:
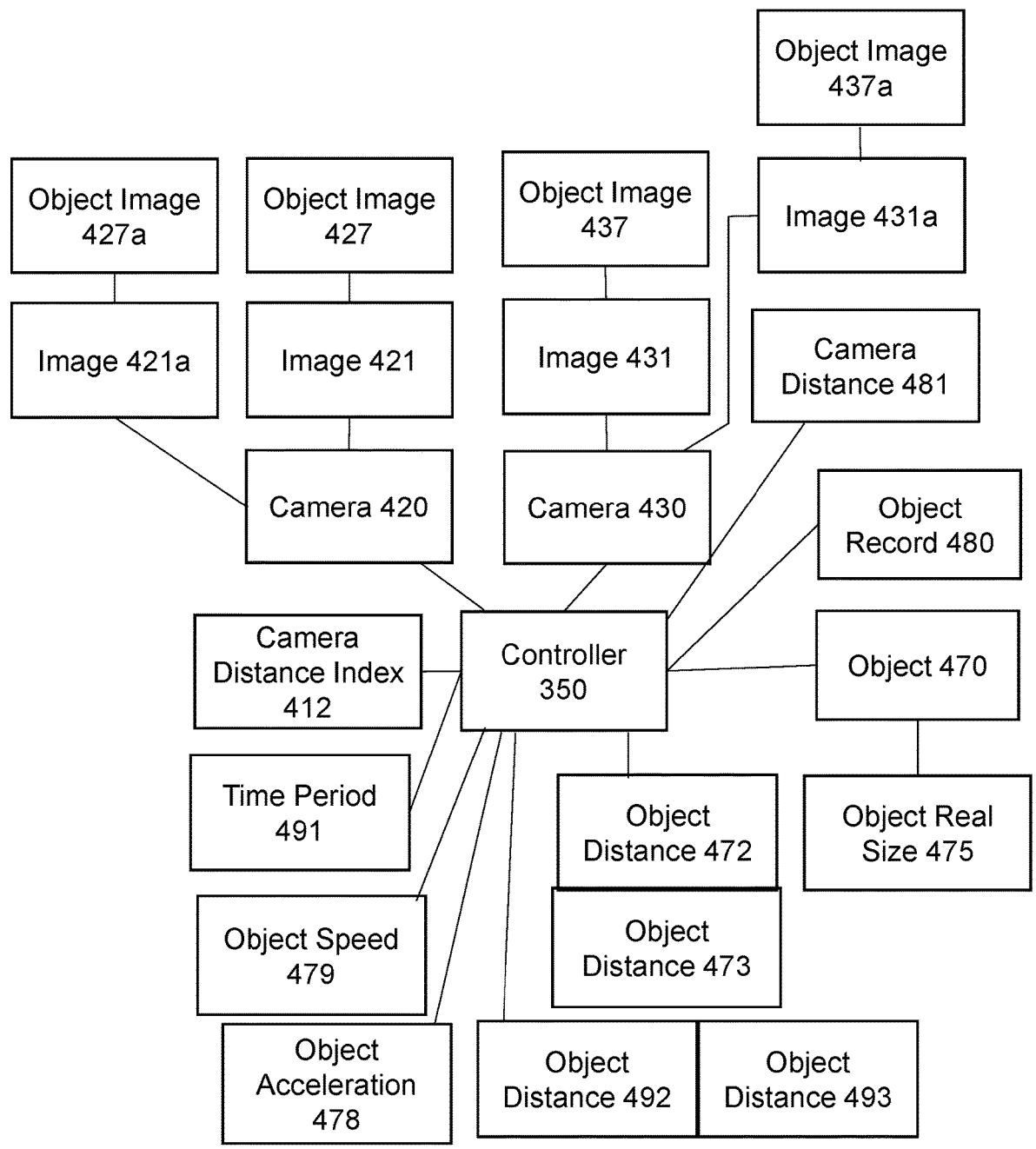
FIG. 1 illustrates an exemplary embodiment of a process to determine a distance from a reference location and real world size of an object using a plurality of image sensors.

FIG. 1 illustrates an exemplary embodiment of a process to determine a distance from a reference location and real world size of an object using a plurality of image sensors. In one embodiment, a controller 350 is connected to a plurality of cameras such as camera 420 and camera 430. The plurality of cameras is placed at pre-determined distance apart. In one embodiment, camera 420 and camera 430 are placed at a pre-determined camera distance 481 apart. In one embodiment, controller 350 instructs camera 420 and camera 430 to capture image 421 and image 431, respectively, of an object 470. In one embodiment, image 421 includes object image 427 of object 470. Controller 350 receives and processes image 421 to retrieve object image 427. In one embodiment, controller 350 processes object image 427 and recognizes object 470 in object image 427. Similarly, in one embodiment, image 431 includes object image 437 of object 470. Controller 350 receives and processes image 431 to retrieve object image 437 and recognizes object 470 in object image 437.

In one embodiment, camera 420 and camera 430 use similar image sensors and are associated with the same camera distance index 412. Controller 350 determines or retrieves camera distance index 412 for camera 420 and camera 430. Controller 350 also obtains the pre-determined camera distance 481. The camera distance index 412 and the camera distance 481 are pre-determined parameters stored at the controller 350 or are accessible to the controller 350. Using camera distance index 412, camera distance 481, object image 427 within image 421, and object image 437 within image 431, controller 350 calculates object distance 472 and object distance 473 of object 470. Object distance 472 is the distance between the camera 420 and the object 470 at the time image 421 is captured. Object distance 473 is the distance between the camera 430 and the object 470 at the time image 431 is captured. In one embodiment, controller 350 calculates object real size 475 of object 470. The object real size 475 measures a real world size such as height, width, length, thickness of object 470.

In one embodiment, controller 350 instructs camera 420 and camera 430 to capture image 421 and image 431 at approximately the same time. In one embodiment, after images 421 and 431 are captured and after a time period 491, controller 350 instructs camera 420 and camera 430 to capture a second set of images 421a and 431a of object 470. Controller 350 processes the second set of images 421a and 431a, recognizes object 470 in the second set of object images 427a and 437a, and calculates a second set of object distance 492 and object distance 493. Here, object distance 492 is the distance between the camera 420 and the object 470 at the time image 421a is captured, and object distance 493 is the distance between the camera 430 and the object 470 at the time image 431a is captured. Based on time period 491, object distance 472 and object distance 492, or object distance 473 and object distance 493, controller 350 determines an object speed 479 of object 470 during time period 491. In one embodiment, object 470 moves during time period 491 while the controller 350 is still, and controller 350 determines object 470 moves at a speed of object speed 471. In one embodiment, controller 350 is housed in a moving vehicle or a moving device and the object 470 is still. Controller 350 determines controller 350 moves at a speed of object speed 479 during time period 491. In one embodiment, both controller 350 and object 470 are moving during time period 491. Controller 350 determines controller 350 moves at an object speed 479 relative to object 470. In one embodiment, controller 350 determines object speed 479 includes the direction of the motion. Controller 350 calculates the direction using the object distance 472, object distance 473, object distance 492, object distance 493, image 421, image 431 and the second set of images 421a and images 431a.

In one embodiment, controller 350 instructs camera 420 and camera 430 to capture a plurality sets of images during time period 491, determines a plurality of object speeds of object 470, and determines an object acceleration 478 of object 470 using the plurality of object speeds over time period 491.

In one embodiment, controller 350 generates an object record 480 to store one or more of: image 421; object image 427; image 431; object image 437; object real size 475; object distance 472; object distance 473; time period 491; object speed 479; and object acceleration 478. In one embodiment, controller 350 stores object record 480 in a datastore. In one embodiment, controller 350 sends object record 480 to a network computing device. In one embodiment, controller 350 returns object record 480 as a result of a query by a piece of software.

Figure 2:
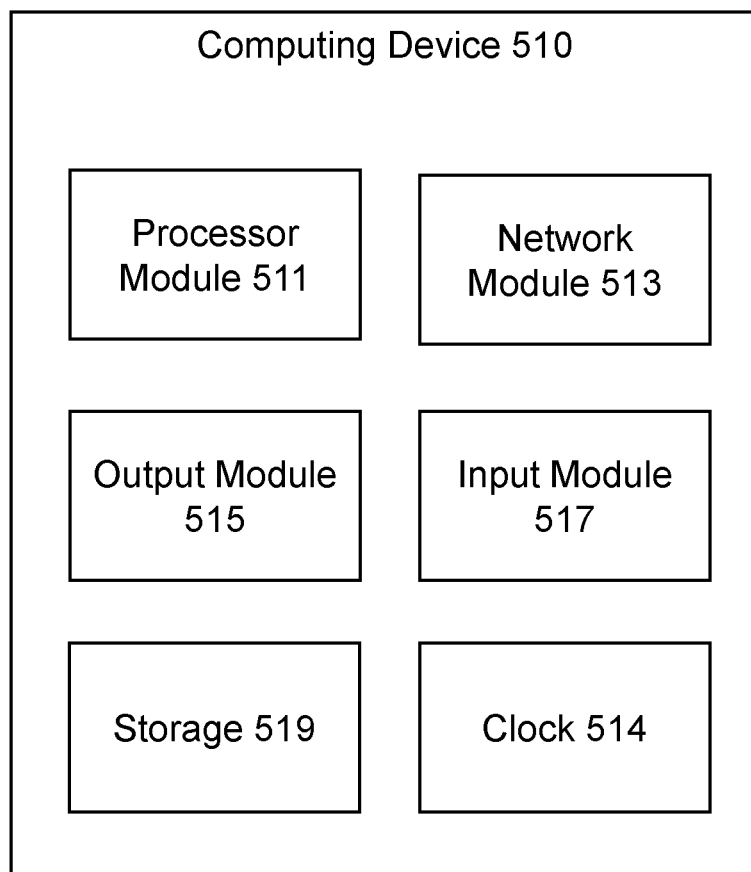
FIG. 2 illustrates an embodiment of a computing device.

FIG. 2 illustrates an exemplary embodiment of hardware components of a computing device which can be used for a controller or to house a controller. In one embodiment, computing device 510 includes a processor module 511, an output module 515, an input module 517, and a storage module 519. In one embodiment, computing device 510 may include a network module 513 or a clock 514. In one embodiment, processor module 511 includes one or more general processors, a multi-core processor, an application specific integrated circuit based processor, a system on a chip (SOC) processor or an embedded processor. In one embodiment, output module 515 includes or connects to a display for displaying video signals, images and text, and an audio speaker to play sound signals. In one embodiment, output module 515 includes a data interface such as USB, HDMI, DVI, DisplayPort, thunderbolt or a wire-cable connecting to a display or a speaker. In one embodiment, output module 515 connects to a display or a speaker using a wireless connection or a wireless data network. In one embodiment, input module 517 includes a physical or logical keyboard, buttons, keys, or microphones. In one embodiment, input module 517 includes or connects to one or more sensors such as a camera sensor, an optical sensor, a night-vision sensor, an infrared (IR) sensor, a motion sensor, a direction sensor, a proximity sensor, a gesture sensor, or other sensors that is usable by a user to provide input to computing device 510. In one embodiment, input module 517 includes a physical panel housing one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, an NFC network, a personal area network (PAN), a WiFi network, or a LiFi network. Storage 519 includes executable instructions when read and executed by the processor module 511 of computing device 510 implement one or more functionality of the current invention. In one embodiment, storage 519 stores images, pictures, data associated to the stored images or pictures, one or more attributes associated to one or more sensors connected to computing device 510.

In one embodiment computer device 510 includes a clock 514, which provides date and time information to computing device 510.

In one embodiment, computing device 510 does not include all the modules. In one embodiment, computing device 510 does not have network module 513 or clock 514.

Figure 2A:
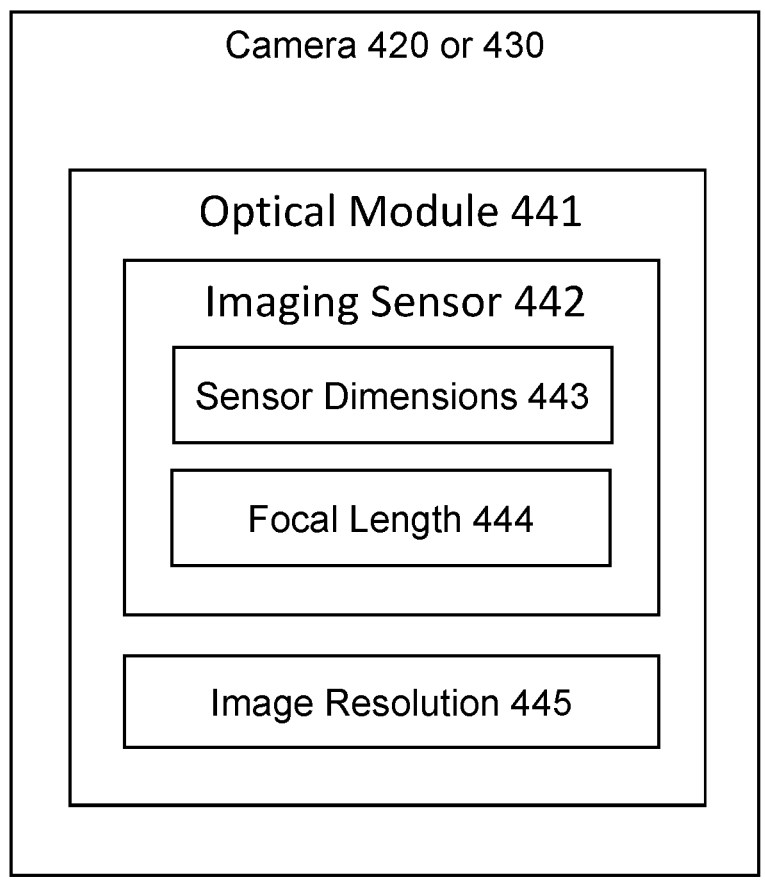
FIG. 2a illustrates an embodiment of a camera.

FIG. 2a illustrates an exemplary embodiment of a camera. Camera 430 or camera 420 contains an optical module 441 with an imaging sensor 442. In one embodiment, imaging sensor 442 has a sensor dimension 443. In one embodiment, camera 430 or camera 420 captures an image 431 or camera 421 using a focal length 444 of imaging sensor 442 with an image resolution 445. In one embodiment, sensor dimension 443 describes an area of image sensor 442 of camera 430 such as 4.17 mm, 3.2 mm, or a length measured in different unit length. In one embodiment, distance index 412 is a number indicating a relationship between distance of an item, real world size of the item, and the image size of the item captured in an image by camera 430 or camera 420. In one embodiment, distance index 412 is calculated by controller 350 using the formula:

Distance Index 412=Image Resolution 445*(Focal Length 444/Sensor Dimension 443)

In one embodiment, image resolution 445 of camera 430 is 4032 pixels wide, focal length of camera 430 is 4 mm, and image sensor dimension 443 of camera 430 is 4.17 mm. Distance index 412 would be calculated as 3867.63.

In one embodiment, distance index 412 can be calibrated by controller 350 by capturing an image of an item of pre-determined real world size at a pre-determined distance from camera 430. In one embodiment, upon capturing the image, controller 350 may determine distance index 412 as $$\text{Distance index 412} = \frac{\text{Pre-determined Distance} * \text{Captured Item Image Size}}{\text{Pre-determined Real World Size}}$$

In one embodiment, camera 430 and camera 420 use similar image sensor with similar sensor dimension, and captures image 431 and image 421 using similar focal length. Therefore, distance index 412 for camera 430 is the same for camera 420. In one embodiment, camera 430 or camera 420 includes a color sensor, a night vision sensor, a near-IR sensor, an optical sensor, or an RGB color sensor.

In one embodiment, camera 420 and camera 430 are placed or mounted on a hand-held digital camera, a hand-held device, or a shoulder camera; on a drone or unmanned flying drone; on top of a passenger car, a bike, a bus or a vehicle; on wind shield of a car, on a pair of glasses or goggles; on a helmet; on a pole, a street light pole, or a utility pole, on a wall, a door, a gate, on a toll booth; on a smart phone, a magnifying glass, or a pen; a laptop, a tablet, or a mobile computer; or on one or more surfaces where it is desirable to capture an image from the surface.

In one embodiment, camera distance 481 measures a distance between camera 420 and camera 430. The camera distance 481 can be 6 inches, 1 feet, 20 feet, 1 inch, 3 cm, 30 cm, 1 m, 5 m, 10 m, or a distance that would allow camera 420 and camera 430 to capture image 421 and image 431 with sufficient information to determine object distance 497, object distance 473 and object real size 475. In one embodiment, object distance 472 or object distance 473 is no more than 100 times, 50 times, or 10 times of camera distance 481.

In one embodiment, time period 491 is determined using a clock module 514 of controller 350. In one embodiment, the length of time period 491 is selected such that object distance 472 and/or object distance 473 allows for an accurate calculation of object speed 479. For example, when object speed 479 is expected to be a value between 0 to 100 mph, 3 sets of images are captured over 2 time periods, and object distance 472 is expected to be at least 30 feet and no more 100 feet, i.e., a range of 70 feet. Controller 350 may use time period 491 of 0.2 second. In another example, object 470 travels at a speed of 100 mph away from camera 420, or about 147 feet per second, or 29.4 feet per time period 491 of 02 seconds. Three sets of images captured using a time period 491 of 0.2 second apart give the 3 values of object distance 472 to be about 29.4 feet apart. This is a total of about 58.8 feet apart between first object distance 472 and the third object distance 472. When the first object distance 472 is 95 feet from the camera 420 and the third object distance 472 is 36.2 feet from camera 420, the total of 58.8 feet apart is within the 30-100 feet range for object distance 472.

In one embodiment, image 421 or image 431 is a digital image of 8K resolution, 7680×4320 resolution, 4K resolution, 4096×2160 resolution, 3860×2160 resolution. In one embodiment, image 421 or image 431 includes a color image, an RGB image, a monochrome image, a grayscale image or a black-and-white image.

In one embodiment, object 470 is a label, a bar code, a QR-code, a coded label, a color label, a label with a pattern, a person, an animal, a car, a vehicle, an flying vehicle, a ball, a sport item, a face, a body, a body part, a hand, a finger, a part of a face, a piece of furniture, a cup, a bottle or an item recognizable by controller 350.

In one embodiment, object distance 472 measures a distance between object 470 to camera 420, a distance between object 470 to a housing of camera 420, an orthogonal or perpendicular distance between object 470 and camera 420. In one embodiment, object distance 473 measures a distance between object 470 to camera 430, a distance between object 470 to a housing of camera 430, an orthogonal or perpendicular distance between object 470 and camera 430. In one embodiment object distance 472 or object distance 473 measures a distance to a point, a place or an area of object 470. In one embodiment, object distance 472 or object distance 473 can be 20 inches, 40 cm, 135 feet, 20 m, 5'4", or 1.67 m.

As described in U.S. Pat. No. 9,922,254, filed on Sep. 13, 2016 and issued on March 2018, and in U.S. patent application Ser. No. 15/991,874, filed on May 29, 2018, incorporated herein by reference, a label can be used to assist an image sensor such as a camera to determine the distance of the label from the image sensor, where a controller recognizes the label from the label image and calculate the distance using the label image. Typically, the label is placed onto or near an object such that the distance of the label can be considered as the distance of the object.

In one embodiment object real size 475 is a real world size of object 470, a dimension, a height, a length, a width, a thickness of object 470. In one embodiment, object real size 475 is 3 inches, 10 cm, 4 feet 2 inches, 2.9 m, 18 feet or 20 m.

In one embodiment, object 470 is a moving object such as a car, a person, an animal, a drone, a flying object, an insect, a sport item, a ball, a birdie, a puck. In one embodiment, object speed 479 measures a speed of object 470 moving. In one embodiment, object speed 479 measures a horizontal speed of object 470 as captured by camera 420 or camera 430. In one embodiment, object speed 479 includes a speed of object 470 moving towards camera 420 or camera 430. In one embodiment, object speed 479 includes a vertical speed of object 470 as captured camera 420 or camera 430. In one embodiment, camera 420 and/or camera 430 is a moving camera and object speed 479 measures a speed of camera 420 and/or camera 430 relative to object 470. In one embodiment object speed 479 is 100 mph, 20 kmph, 10 feet per second, or 1 m per second.

In one embodiment controller 350 includes a computing device as illustrated in FIG. 2 housed in a smartphone, a head-mounted device (HMD), a glass frame, a goggle, a binocular, a magnifying glass, a helmet, a pen, a dress pin, a headset, a wearable device, a mobile computing device, a portable device, a car, a vehicle, a bus, a flying device, a digital camera, a street pole, a gate, a toll booth, a server, a PC, a mini-PC or an embedded computing chassis.

Figure 3:
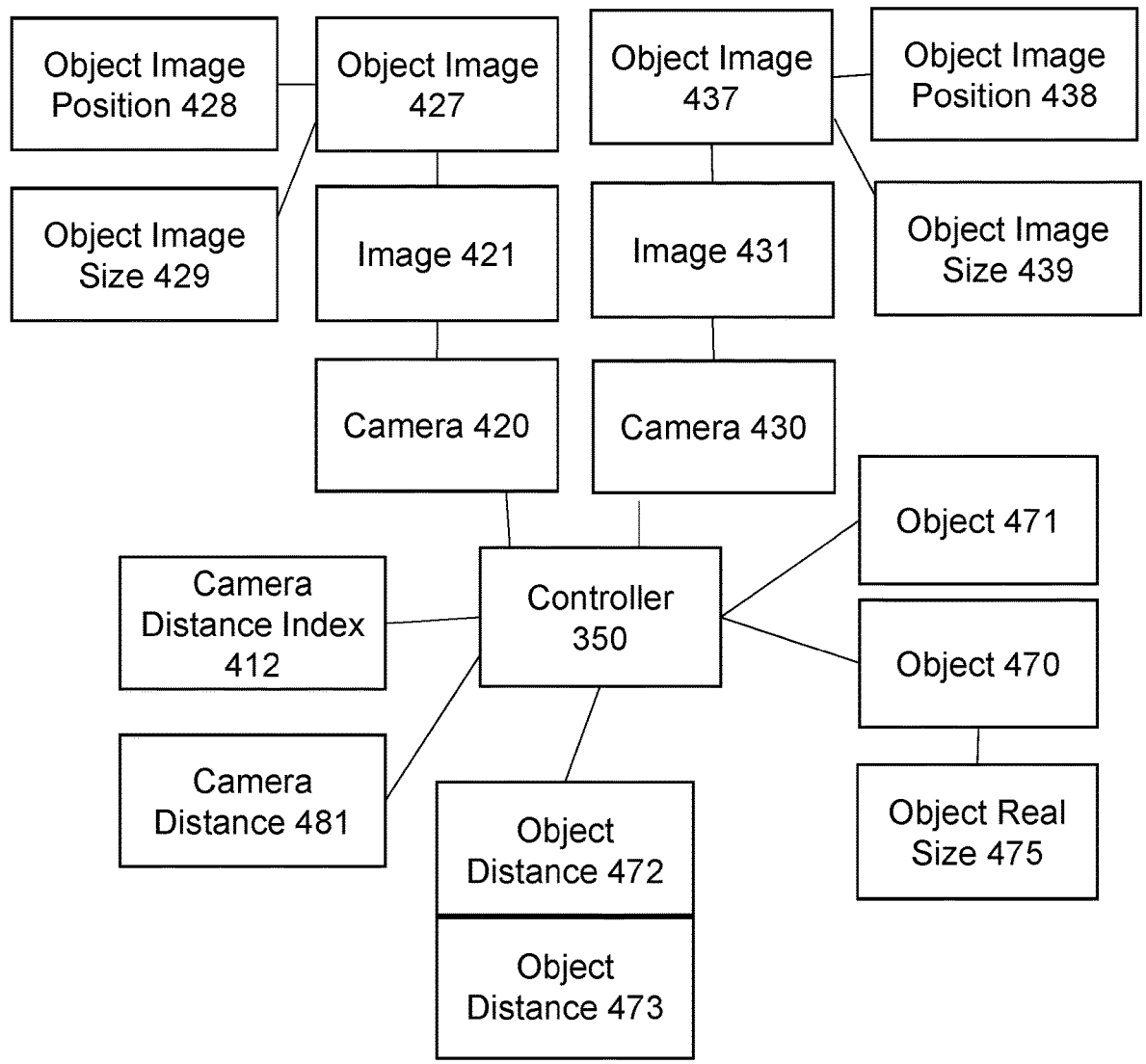
FIG. 3 illustrates an exemplary embodiment to calculate a distance of an object captured by two cameras.

FIG. 3 illustrates an exemplary embodiment to calculate a distance from a reference location using images of an object captured by two cameras. In one embodiment, camera 420 and camera 430 are placed at a camera distance 481 apart. In one embodiment, camera 420 and camera 430 can be placed in a front-back manner while both cameras face forward to capture images (see FIG. 4a), in a left-right manner at the same vertical position while both cameras face forward to capture images (see FIG. 4b), in a top-bottom manner at the same horizontal position while both cameras face forward to capture images (see FIG. 4c), at the same horizontal and vertical positions while both cameras face each other to capture images (see FIG. 4d), or in any positions while both cameras capture images with overlap areas.

In one embodiment, camera 420 captures, automatically or with a manually triggered instruction from controller 350, an image 421 which includes an object image 427. Controller 350 receives image 421 from camera 420 and retrieves object image 427. In one embodiment, controller 350 determines object image size 429 of object image 427. In one embodiment, controller 350 determines object image position 428 of object image 427 in image 421. For example, image 421 includes a 3860×2160 pixel resolution, object image 427 includes a 507×314 sub image of image 421. The object image size 429 includes a height of object image 427, or 314 pixels in above example. The object image size 429 includes a width of object image 427, or 507 pixels in above example. The object image position 428 indicates a position of object image 427 in image 421. In one embodiment, object image position 428 measures from center of object image 421, top left corner, bottom right corner, top center, right most position of object image 421. In one embodiment, object image position 428 measures to center of image 421, left most edge, right most edge, top edge, bottom edge, top center, bottom right, top left of image 421. In one embodiment, object image position 428 is 2152 pixels from left edge or a x-position of 2152, −129 left from center or a x-position of −129, 817 pixels from bottom edge or a y-position of 817, 92 pixels top of center or a y-position of 92.

Similarly, camera 430 captures image 431 which includes object image 437. Controller 350 obtains image 431 from camera 430, retrieves object image 437 from image 431, and determines object image position 438 and object image size 439 of object image 437.

In one embodiment, controller 350 processes object image 427 and recognizes object image 427 to be object 470. In one embodiment, object 470 includes a face and controller 350 recognizes a face, using a facial recognition method, in object image 427. In one embodiment, object 470 includes a QR-code and controller 360 recognizes the QR-code object image 427, and optionally retrieves the code in the QR-code of object 470. In one embodiment, object 470 includes a car and controller 350 recognizes a license plate from object image 427 and optionally determines the license number on the license plate. In one embodiment, controller 350 process object image 437 and recognizes object image 437 to be object 471. Controller 350 matches object 470 and object 471 to determine both are the same object. In one embodiment, controller 350 recognizes object 470 and object 471 to be two cars, matches the license number of object 470 and the license number of object 471, and determines the car of object 470 is the same as the car of object 471. In one embodiment, controller 350 recognizes object 470 to include a pattern matching the pattern of object 471, and determines object 470 to be the same as object 471. In one embodiment, controller 350 matches object image position 428 of object image 427 is close to object image position 438 of object image 437 and object image 429 is comparable to object image size 439, and controller 350 determines object 470 is the same as object 471. Upon recognizing object 470, controller 350 proceeds to calculate object distance 472 and object distance 473.

In one embodiment, camera 420 and camera 430 include similar image sensors which relate to camera distance index 412. A camera distance index 412 property relates to the distance index 412 as follows:

$$\text{Distance index 412} = \frac{\text{Object distance 472} * \text{Object Image Size 429}}{\text{Object Real Size 475}} \quad (E1)$$

and $$\text{Distance index 412} = \frac{\text{Object distance 473} * \text{Object Image Size 439}}{\text{Object Real Size 475}} \quad (E2)$$

Figure 4A:
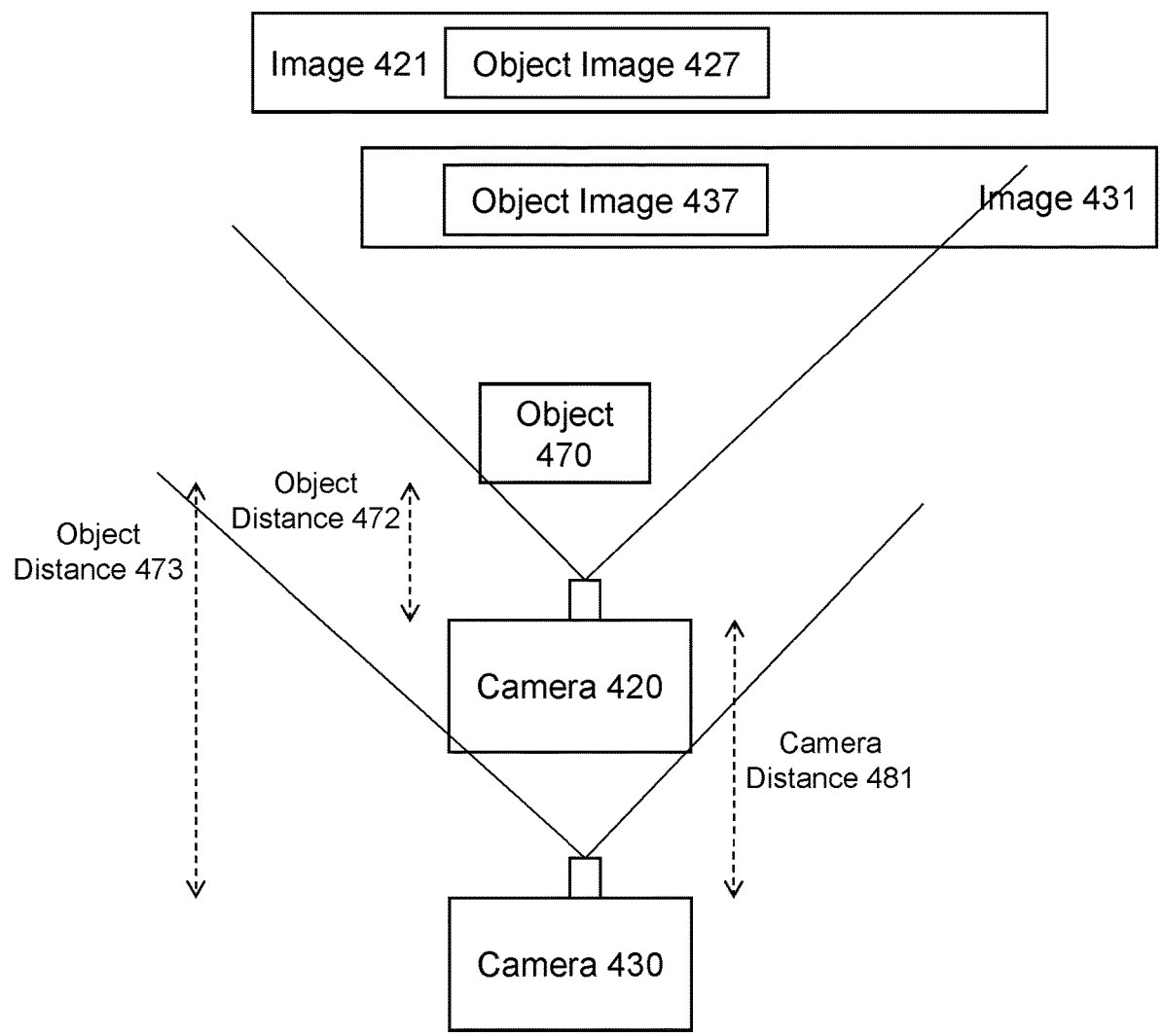
FIG. 4a illustrates an exemplary embodiment of a forward facing front-back pair of cameras.

FIG. 4a illustrates a system where camera 420 and camera 430 are positioned in a front-back manner at the same horizontal and vertical positions and capture image 421 and image 423 while facing forward in the same manner. In one embodiment, camera 420 is at front and camera 430 is at the back position, resulting in an object distance 473 as follows:

Object distance 473=Object distance 472+Camera distance 481 (E4a1)

Combining E1, E2 and E4a1, and eliminating distance index 412 and object real size 475 results in the following:

(Object Distance 472+Camera Distance 481)*Object Image Size 439=Object distance 472*Object Image Size 429 or $$\text{Object Distance 472} = \frac{\text{Camera Distance 481} * \text{Object Image Size 439}}{\text{Object Image Size 429} - \text{Object Image Size 439}} \quad (E4a2)$$

In one embodiment, controller 350 determines object distance 472 and object distance 473 using (E4b2) and (E4b1). Upon determining object distance 472 or object distance 473, controller 350 calculates object real size 475 using (E1), resulting in the following:

$$\text{Object Real Size 475} = \frac{\text{Object distance 472} * \text{Object Image Size 429}}{\text{Distance index 412}} \quad (E4a1a)$$

Alternatively, controller 350 calculates object real size 475 using (E2), resulting in the following:

$$\text{Object Real Size 475} = \frac{\text{Object distance 473} * \text{Object Image Size 439}}{\text{Distance index 412}} \quad \text{(E4a1b)}$$

In one embodiment, camera 420 and camera 430 are mounted on a hand held camera system facing forward with a camera distance 481 being 6 inches, where camera 420 is at the front and camera 430 is at the back. Camera 420 and camera 430 are associated to distance index 412 of value 3867. Camera 420 captures image 421 of object 470 with object image 427 having object image size 429 being 2200 pixels wide. Camera 430 captures image 431 having object image 439 being 2000 pixels wide. Using (E4a2), controller 350 calculates object distance 472 to be 60 inches, or object 470 is 60 inches away from camera 420. Using (4a1a), controller 350 calculates object real size 475 to be about 34.13 inches wide.

Figure 4B:
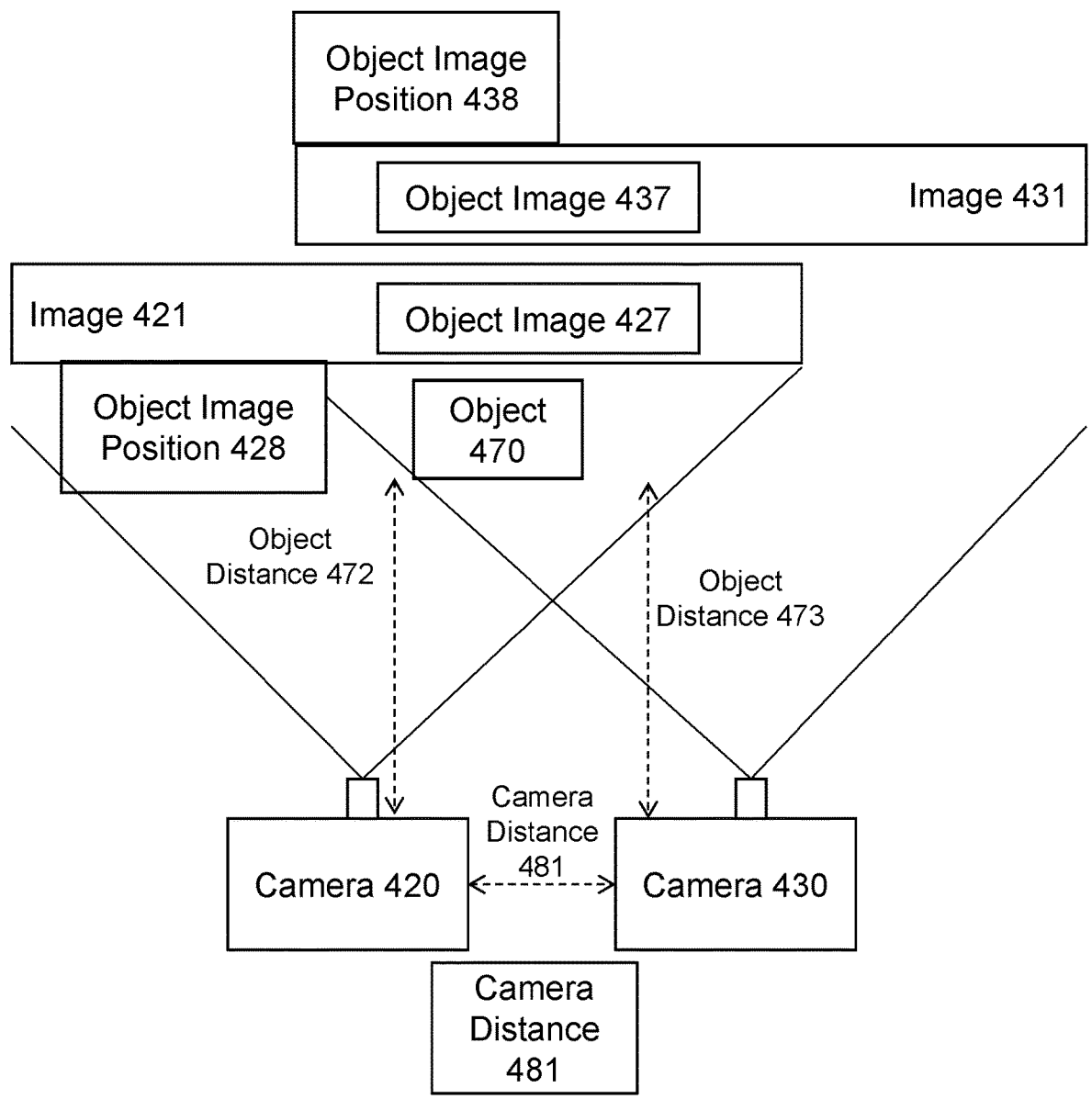
FIG. 4b illustrates an exemplary embodiment of a forward facing left-right pair of cameras.

FIG. 4b illustrates a system where camera 420 and camera 430 are housed side by side in a left-right manner at the same vertical position and facing forward when capturing images. In one embodiment, camera 420 is on the left and captures image 421 which includes object image 427 of object 470. Camera 430 is on the right and captures image 431 which includes object image 437 of object 470. In one embodiment, camera 420 and camera 430 are of camera distance 481 apart measured horizontally. Object distance 472 and object distance 473 are the same.

In one embodiment, controller 350 processes object image 427 and determines object image position 428 of object image 427 in image 421. Similarly, controller 350 processes object image 437 and determines object image position 438 of object image 438 in image 431. In one embodiment, using the relationship of camera distance 481 to object image position 428 and object image position 438, the following is derived using (E1), resulting in the following:

$$\text{Distance index 412} = \frac{\text{Object distance 472} *}{\text{Camera Distance 481}} \quad \text{(E4b1)}$$

Re-arranging the terms in (E4b1), controller 350 can calculate object distance 472 as follows:

$$\text{Object distance 472} = \frac{\text{Distance index 412} * \text{Camera Distance 481}}{\text{Object Image Position 428} - \text{Object Image Position 438}} \quad \text{(E4b1a)}$$

where object distance 473=object distance 472.

Combining (E4b1a) with (E1), controller 350 can calculate object real size 475 as follows:

$$\text{Object Real Size 475} = \frac{\text{Object Image Size 429} * \text{Camera Distance 481}}{\text{Object Image Position 428} - \text{Object Image Position 438}} \quad \text{(E4b2a)}$$

Combining (E4b1a) and (E2), controller 350 can calculate object real size 475 as follows:

$$\text{Object Real Size 475} = \frac{\text{Object Image Size 439} * \text{Camera Distance 481}}{\text{Object Image Position 428} - \text{Object Image Position 438}} \quad \text{(E4b2b)}$$

In one embodiment, camera 420 and camera 430 face towards object 470 when capturing images 421 and image 431. In one embodiment, object distance 472 measures the perpendicular distance of object 470 from camera 420, and object distance 473 measures the perpendicular distance of object 470 from camera 430. Object distance 472 and object distance 473 are of the same value. In one embodiment, controller 350 sets object distance 473 to be the same as object distance 472.

In one embodiment, camera 420 and camera 430 are mounted on a pair of smart glasses or a head mounted device, where camera 420 and camera 430 both face forward with a camera distance 481 being 5 inches and where camera 420 is on the left and camera 430 is on the right. Camera 420 and camera 430 are associated with a distance index 412 value of 3867. Camera 420 captures image 421 of object 470 with object image 427 having object image size 429 being 352 pixels wide, and an object image position 428 at 2000 pixels of image 421. Camera 430 captures image 431 having object image size 439 being 352 pixels wide and on object image position 438 at 1825 pixels of image 431. Using (E4b1a), controller 350 calculates object distance 472 to be about 110.5 inches, or object 470 is 110.5 inches away from camera 420. Using (E4b2a), controller 350 calculates object real size 475 to be about 10.06 inches wide.

Figure 4C:
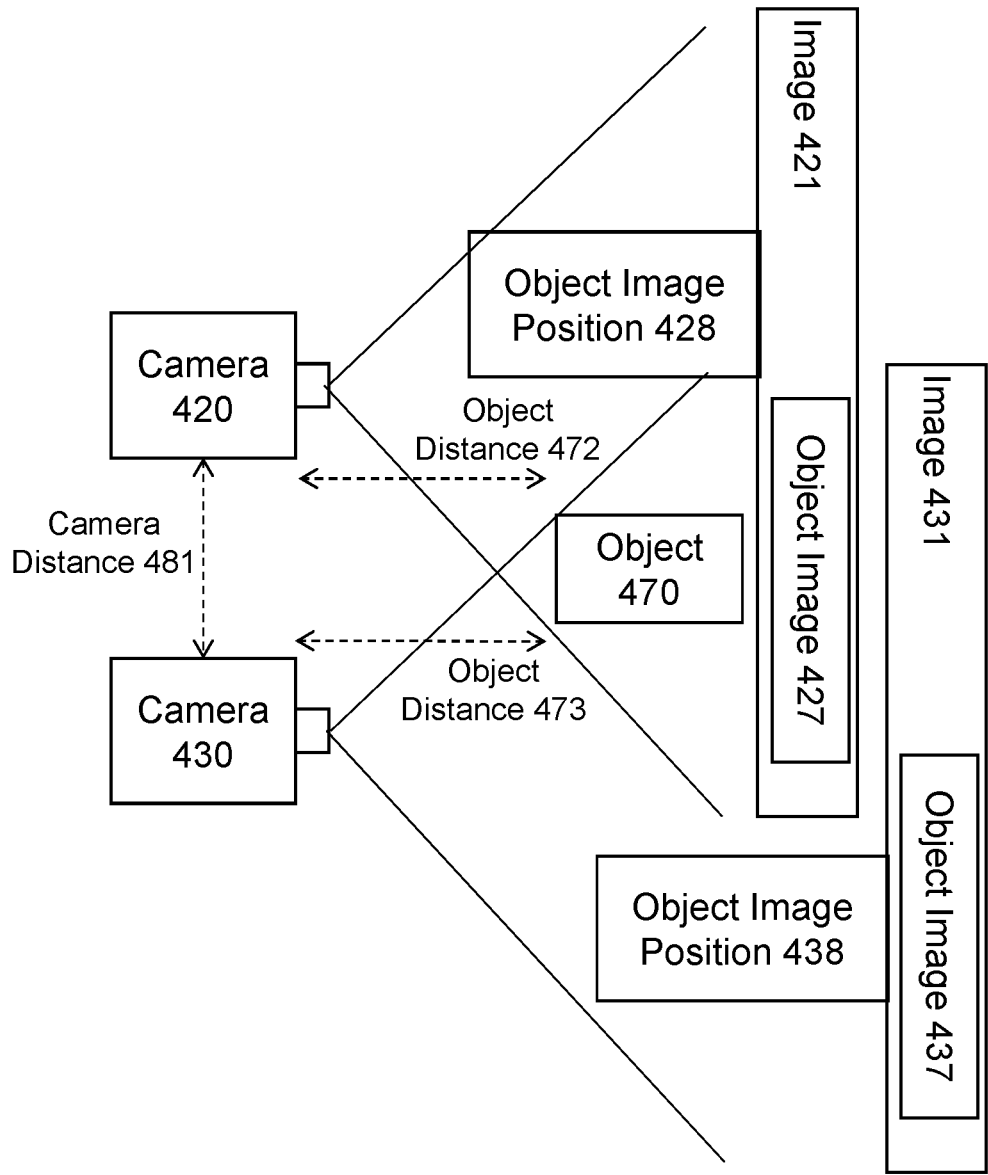
FIG. 4c illustrates an exemplary embodiment of a forward facing top-bottom pair of cameras.

FIG. 4c illustrates a system where camera 420 and camera 430 are housed side by side in a top-bottom manner at the same horizontal position and facing forward when capturing images. In one embodiment, camera 420 is on the top and captures image 421 which includes object image 427 of object 470. Camera 430 is on the bottom and captures image 431 which includes object image 437 of object 470. In one embodiment, camera 420 are camera 430 are of camera distance 481 apart measured vertically. In one embodiment, using similar calculations as illustrated with FIG. 4b, controller 350 may calculate object distance 472 as follows:

$$\text{Object distance 472} = \frac{\text{Distance index 412} * \text{Camera Distance 481}}{\text{Object Image Position 428} - \text{Object Image Position 438}} \quad \text{(E4c1a)}$$

where object distance 473=object distance 472.

Controller 350 also calculates the object real size 475 as follows:

$$\text{Object Real Size 475} = \frac{\text{Object Image Size 429} * \text{Camera Distance 481}}{\text{Object Image Position 428} - \text{Object Image Position 438}} \quad \text{(E4c2a)}$$

or as follows:

$$\text{Object Real Size 475} = \frac{\text{Object Image Size 429} * \text{Camera Distance 481}}{\text{Object Image Position 428} - \text{Object Image Position 438}} \quad \text{(4c2b)}$$

In one embodiment, camera 420 and camera 430 are mounted on a street pole where camera 420 and camera 430 both face forward with a camera distance 481 being 2 feet and where camera 420 is on the top and camera 430 is on the bottom. Camera 420 and camera 430 are associated with a distance index 412 value of 1872. Camera 420 captures image 421 of object 470 with object image 427, for example a passenger car, having object image size 429 being 725 pixels wide, and an object image position 428 at 5000 pixels of image 421. Camera 430 captures image 431 having object image size 439 being 725 pixels wide and on object image position 438 at 4920 pixels of image 431. Using (E4c1a), controller 350 calculates object distance 472 to be about 46.8 ft, or object 470 is 46.8 ft away from camera 420. Using (4c2a), controller 350 calculates object real size 475, or the passenger car length, to be about 18.125 ft long.

Figure 4D:
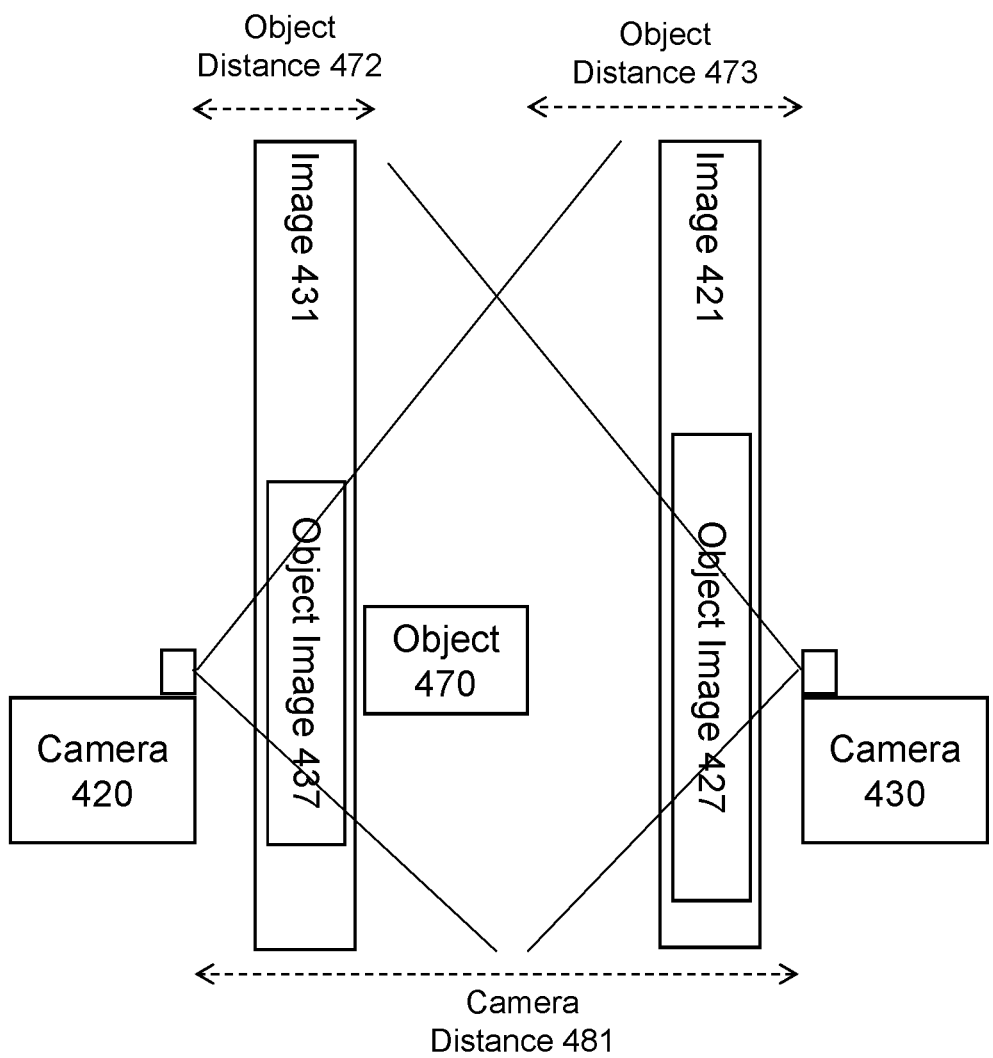
FIG. 4d illustrates an exemplary embodiment of an opposite facing left-right pair of cameras.

FIG. 4d illustrates a system where camera 420 and camera 430 are housed side by side in a left-right manner at the same vertical position and facing each other when capturing images. In one embodiment, camera 420 is on the left, faces towards camera 430, and captures image 421 which includes object image 427 of object 470. Camera 430 is on the right, faces towards camera 420, and captures image 431 which includes object image 437 of object 470. In one embodiment, the camera distance 481 between camera 420 and camera 430 are measured horizontally. In one embodiment, controller 350 determines the sum of object distance 472 and object distance 473 to be equal to camera distance 481 as follows:

$$\text{Camera Distance 481} = \text{Object Distance 472} + \text{Object Distance 473} \quad \text{(E4d1)}$$

In one embodiment, object real size 475 is calculated for a height or length of object 470. Object image size 429 measures the height of object image 427, and object image size 439 measures the height of object image 437. Combining (E1) and (E2) results in the following:

$$\text{Object Distance 472} * \text{Object Image Size 429} = \text{Object Distance 473} * \text{Object Image Size 439} \quad \text{(E4d2)}$$

Further combining (E4d2) and (E4d1) results in the following:

$$\text{Object distance 472} = \frac{\text{Camera Distance 481} * \text{Object Image Size 439}}{\text{Object Image Size 429} + \text{Object Image Size 439}} \quad \text{(E4d3a)}$$

or the following:

$$\text{Object distance 473} = \frac{\text{Camera Distance 481} * \text{Object Image Size 429}}{\text{Object Image Size 429} + \text{Object Image Size 439}} \quad \text{(E4d3b)}$$

In one embodiment, controller 350 can apply (E4d3a), (E4d3b) and (E4d1) to determine object distance 472 and object distance 473. In one embodiment, controller 350 can apply (E1) or (E2) to calculate object real size 475 as follows:

$$\text{Object Real Size 475} = \frac{\text{Object distance 472} * \text{Object Image Size 429}}{\text{Distance index 412}} \quad \text{(E4d4a)}$$

Or as follows:

$$\text{Object Real Size 475} = \frac{\text{Object distance 473} * \text{Object Image Size 439}}{\text{Distance index 412}} \quad \text{(E4d4b)}$$

In one embodiment, camera 420 and camera 430 are mounted on two street poles, where camera 420 and camera 430 face each other with the two street poles being 40 ft apart. Camera distance 481 is thus 40 feet, where camera 420 is on the left street pole and camera 430 is on the right street pole. Camera 420 and camera 430 are associated with distance index 412 value of 3744. Camera 420 captures image 421 of object 470 with object image 427, for example a person, having object image size 429 being 675 pixels long. Camera 430 captures image 431 having object image size 439 being 1425 pixels long. Using (E4d1a), controller 350 calculates object distance 472 to be about 27.14 ft, or object 470 is 27.14 ft away from street pole having camera 420. Using (E4d1), controller 350 calculates object 473 to be about 12.86 ft, or object 470 is about 12.86 ft away from the street pole having camera 430. Using (4d4a), controller 350 calculates object real size 475, or the person's height, to be about 4.89 ft tall.

FIG. 5 illustrates an exemplary embodiment of placement of synchronous cameras. In one embodiment, the synchronous cameras 620, which includes camera 420 and camera 430, can be mounted on a single chassis, a dual chasses, or multiple chasses, where each chassis container includes one or more cameras. In one embodiment, the synchronous cameras are mounted on top of a car, front of a vehicle, or at the back of a vehicle. In one embodiment, a vehicle, such as a car, a bus, a train, a ship, or a boat, includes one or more synchronous cameras.

In one embodiment, the synchronous cameras 620 are mounted on street poles, light poles, or utility poles. In one embodiment, camera 420 and camera 430 are mounted on the same pole. In one embodiment, camera 420 and camera 430 are mounted on two different poles. The synchronous cameras can be used to detect a parked car, a moving vehicle, a person, a walking person, a pet, or an animal.

In one embodiment, the synchronous cameras are mounted on a booth, a check point gate, outside a window, outside a door, on a building wall, or on a security gate. The synchronous cameras can be used to detect a parked car, a moving vehicle and its speed, a person and her height, a walking person and his speed, a pet, or an animal and its size.

In one embodiment, the synchronous cameras are mounted on a drone, an autonomous driving vehicle, or an unmanned autonomous flying vehicle. The synchronous cameras can be used to detect a nearby car, a moving vehicle and its speed relative speed to the drone or vehicle housing the synchronous cameras, a landmark, a sign, a person and her height, a walking pedestrian and his speed, a pet, or an animal and its size.

In one embodiment, the synchronous cameras are mounted on a television set, a display screen, or a mirror. The synchronous cameras can be used to detect a person, a pet, or a part of a body such as a hand in front of the display or mirror.

In one embodiment, the synchronous cameras 620 are mounted on a wearable such as glasses, a head mounted device (HMD), a smart glass, a goggle, or a helmet. The synchronous cameras can be used to detect an object in front of the wearable, including this distance and size of the object from the person wearing the synchronous cameras.

In one embodiment, the synchronous cameras 620 are used in a digital camera or a smart phone to help capture 3D images, where the distance and size of objects in the images can be determined using the synchronous cameras 620.

Figure 6:
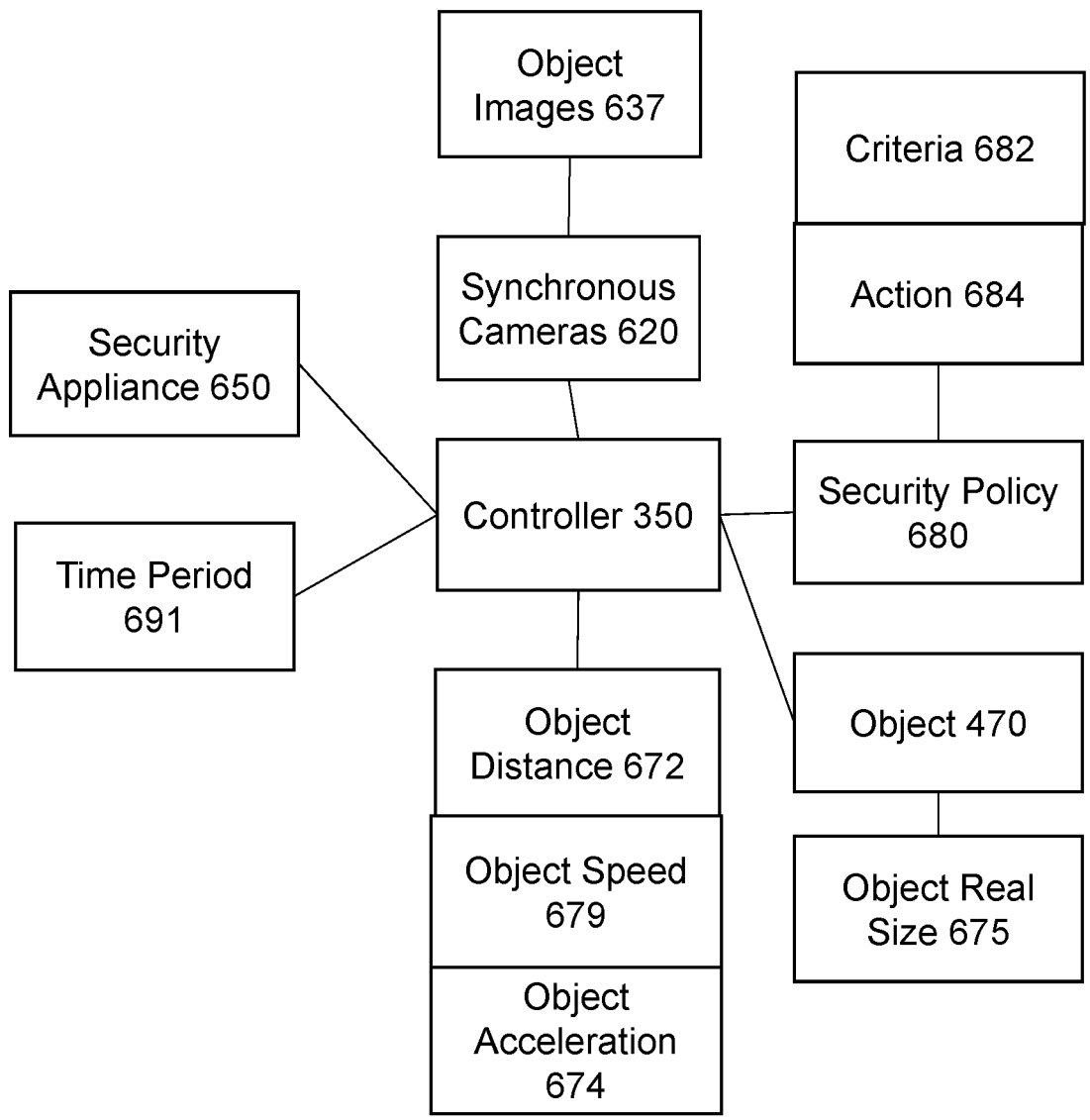
FIG. 6 illustrates an exemplary embodiment of a security appliance using synchronous cameras.

FIG. 6 illustrates an exemplary embodiment of a security appliance using synchronous cameras. In one embodiment, security appliance 650 includes controller 350 and synchronous cameras 620 mounted on security appliance 650. In one embodiment, synchronous cameras 620 capture a plurality of objects images 637 of object 470. Controller 350 receives object images 637 and determines, based on object images 637 and properties of synchronous cameras 620, as described above, one or more of object distance 672, object speed 679, object acceleration 674 and object real size 675 related to object 470. In one embodiment, object images 637 are captured over a time period 691, where object distance 672, object speed 679 and object acceleration 674 are associated with time period 691.

In one embodiment, security appliance 650 includes a motion detector, a security door bell, a speed detector, a security gate, a toll booth, a security check point, a light or electricity controller, a thermostat, a security monitor, a security door, or any security device monitoring surrounding using synchronous cameras 620.

In one embodiment, security appliance 650 includes at least one security policy 680, each security policy including one or more criteria 682 associated with an action 684. Controller 350 determines whether the criteria 682 of the security policy 680 are satisfied by a combination of one or more of the object distance 672, object speed 679, object acceleration 674, object real size 675 and time period 691. When the controller 350 determines criteria 682 are satisfied, controller 350 performs the associated action 684. Criteria 682 may include: a pre-determined range for the object distance 672; object real size 675 equivalent to a size of a kid, an adult, a pet, a car, or a truck; object speed 679 below or above a pre-determined threshold; object acceleration below or above another pre-determined threshold; time period 691 equal to a value or within a range of values. The associated action 684 may include: send a notification, an alert message, an email, a citation, object image 637; sound an audible alarm; turn on/off a light switch or a heater or air conditioning unit; activate, deactivate, lock or unlock a door, a gate, a block; record object images 637, object real size 675, object distance 672, object speed 679, object acceleration 674 or time period 691; instruct synchronous cameras 620 to capture images or video and to record the captured images or video; or trigger a security action.

In one embodiment, controller 350 checks the criteria 682 of the security policy 680 to determine if object distance 672 is within 10 feet and object real size 675 is of a person size. When these criteria 682 are satisfied, the controller 350 records object images 637 and sends an alert. In one embodiment, controller 350 checks the criteria 682 of the security policy 680 to determine if object distance 672 is within 50 yards and continuously reducing over time period 691, object real size 675 is of a vehicle, object speed 679 is fast than 20 kmph, and object acceleration 674 is not decelerating enough that object 470 is projected to hit a check point. When these criteria 682 are satisfied, the controller 350 activates a road spike. In one embodiment, controller 350 checks the criteria 682 of the security policy 680 to determine if object distance 672 is within 50 yards and continuously reducing over time period 691, object real size 675 is of a vehicle, and object speed 679 is slower than 5 mph. When these criteria 682 are satisfied, the controller 340 deactivates a gate to allow object 470 to drive through the gate. In one embodiment, controller 350 checks the criteria 682 of the security policy 680 to determine if object real size 675 is of a vehicle and object speed 679 is faster than 35 mph. When these criteria 682 are satisfied, the controller 350 issues a speeding citation to object 470. In one embodiment, controller 350 checks the criteria 682 of the security policy 680 to determine if object distance 672 over time period 691 is increasing and exceeds 50 feet and object real size 675 is that of a person. When these criteria 628 are satisfied, the controller 340 turns off a light or turn down thermometer.

In one embodiment, when controller 350 determines none of the security policies are satisfied, controller 350 instructs the synchronous cameras 620 to capture a second set of object images. The controller 350 then determines whether the criteria 682 of the security policy 680 are satisfied by the second set of object images. In one embodiment, controller 350 records object images 637, time period 691, object distance 672, etc., even when none of the security policies are satisfied.

Figure 7:
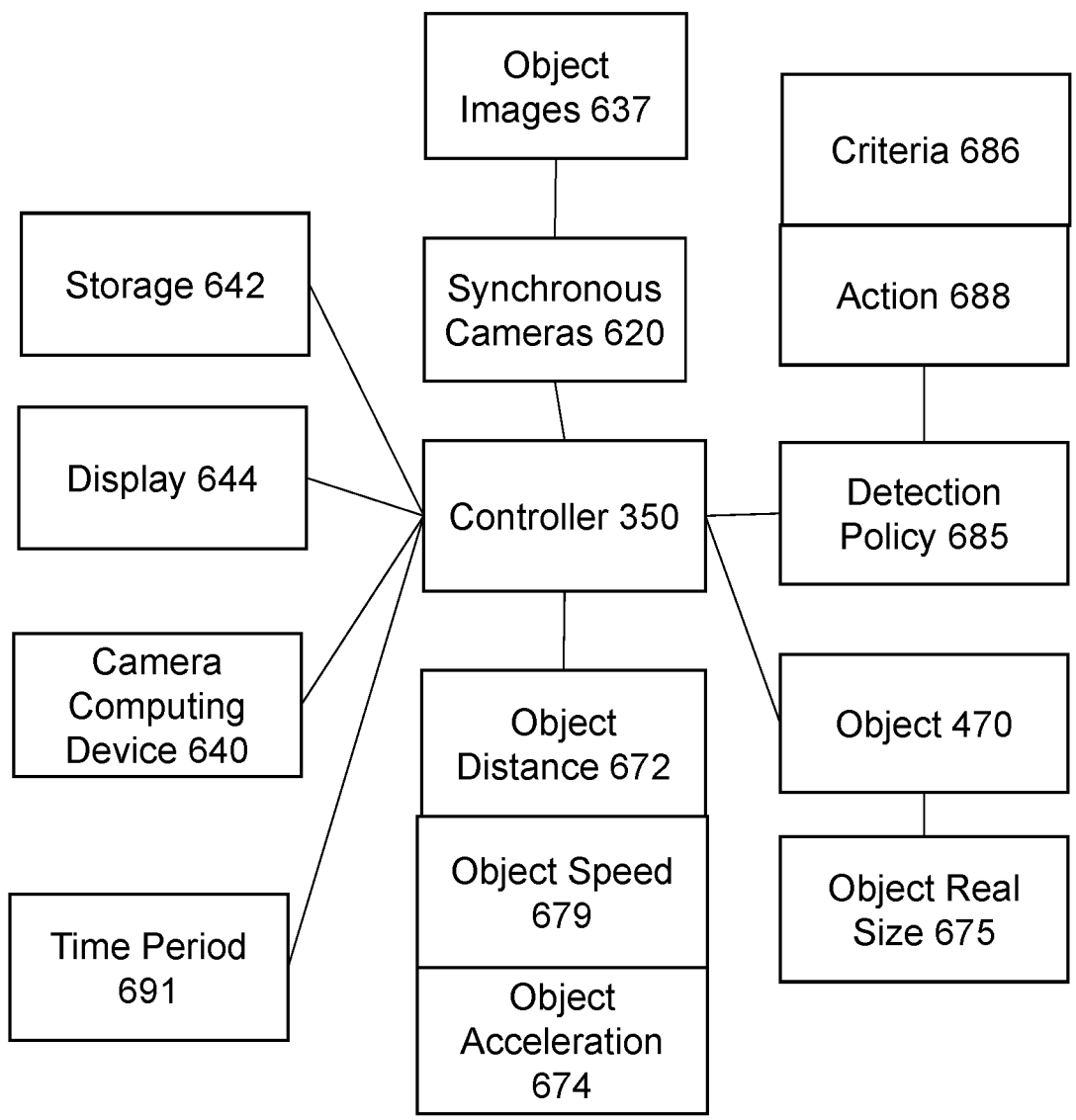
FIG. 7 illustrates an exemplary embodiment of camera appliance using synchronous cameras.

FIG. 7 illustrates an exemplary embodiment of camera computing device using synchronous cameras. In one embodiment, camera computing device 640 includes controller 350 and synchronous cameras 620 mounted on camera computing device 640. In one embodiment, camera computing device 640 includes a storage 642 and/or display 644. In one embodiment, synchronous cameras 620 capture a plurality of objects images 637 of object 470. Controller 350 receives object images 637 and determines, based on object images 637 and properties of synchronous cameras 620, as described above, one or more of object distance 672, object speed 679, object acceleration 674 and object real size 675 related to object 470. In one embodiment, object images 647 are captured over a time period 691, where object distance 672, object speed 679 and object acceleration 674 are associated with time period 691.

In one embodiment, camera computing device 640 includes a smart phone, a smart glasses, a drone, a mirror, a television set, a display monitor, a digital camera, or a video camera.

In one embodiment, camera computing device 640 includes at least one detection policy 685, each detection policy including one or more criteria 686 associated with an action 688. Controller 350 matches detection policy 685 to if criteria 686 are satisfied by a combination of object distance 672, object speed 679, object acceleration 674, object real size 675 and time period 691. When controller 350 determines criteria 686 are satisfied, controller 350 performs the associated action 688. Criteria 686 may include: a pre-determined range for the object distance 672; object real size 675 equivalent to a size of a kid, an adult, a pet, a car, or a truck; object speed 679 below or above a pre-determined threshold; object acceleration below or above another pre-determined threshold; time period 691 equal to a value or within a range of values. The associated action 684 may include: send a notification or a message; display object image 637 and object distance 672; store object images 637, object real size 675, object distance 672, object speed 679, object acceleration 674 or time period 691; or instruct synchronous cameras 620 to capture images or video and to record the captured images or video.

In one embodiment, controller 350 checks the criteria 686 of the detection policy 685 to determine if object distance 672 is within 10 feet and object real size 675 is of a person size. When these criteria 686 are satisfied, the controller 350 displays object images 637 onto display 644 with a filter around object 470 in object images 637. In one embodiment, controller 350 checks the criteria 686 of the detection policy 685 to determine if object distance 672 is within 20 feet and continuously reducing over time period 691 and object real size 675 is of a pet. When these criteria 686 are satisfied, the controller 350 instructs synchronous cameras 620 to start recording allows a user to play a video game based on object 470. In one embodiment, controller 350 checks the criteria 686 of the detection policy 685 to determine if object distance 672 is within 6 feet and continuously decreasing over time period 691 and object real size 675 is at least 2 feet tall. When these criteria 686 are satisfied, the controller 350 plays an audio clip to alert a user of camera computing device 640 that the user to walking into object 470.

In one embodiment, when controller 350 determines that none of detection policies are satisfied, controller 350 instructs synchronous cameras 620 to capture a second set of object images. The controller 350 then determines whether the criteria 686 of the detection policy 685 is satisfied by the second set of object images. In one embodiment, controller 350 records object images 637, time period 691, object distance 672, etc., even when none of the detection policies are satisfied.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system, comprising:
   a first camera associated with a distance index, the first camera capturing a first image comprising a first object image of an object;
   a second camera associated with the distance index, the second camera capturing a second image comprising a second object image of the object, the second image captured at approximately a same time as the first image, wherein the first camera and the second camera are positioned in a front-back manner; and
   a controller configured to:
   (a) obtain the distance index, a camera distance between the first camera and the second camera;
   (b) receive the first image from the first camera and the second image from the second camera;
   (c) retrieve the first object image in the first image and retrieve the second object image from the second image; and
   (d) determine a first object image size of the object in the first object image and determine a second object image size of the object in the second object image;
   (e) calculate a first object distance between the first camera and the object using the distance index, the camera distance, the first object image size, and the second object image size, comprising:
      (e1) calculate the first object distance as a ratio of a product of the camera distance and the first object image size to a difference between the first object image size and the second object image size; and
   (f) calculate an object real size of the object using the first object distance, the second object image, the camera distance, and the distance index, comprising:
      (f1) calculate the object real size as a ratio of a product of the first object distance and the first object image size to the distance index.

2. A system, comprising:
   a first camera associated with a distance index, the first camera capturing a first image comprising a first object image of an object;
   a second camera associated with the distance index, the second camera capturing a second image comprising a second object image of the object, the second image captured at approximately a same time as the first image, wherein the first camera and the second camera are positioned side by side in a left-right manner or are positioned side by side in a top-bottom manner; and
   a controller configured to:
   (a) obtain the distance index, a camera distance between the first camera and the second camera;
   (b) receive the first image from the first camera and the second image from the second camera;
   (c) retrieve the first object image in the first image and retrieve the second object image from the second image;
   (d) determine a first object image size of the object in the first object image and determine a second object image size of the object in the second object image;
   (e) calculate a first object distance between the first camera and the object using the distance index, the camera distance, the first object image size, and the second object image size, comprising:
      (e1) determine a first object image position of the first object image in the first image and determine a second object image position of the second object image in the second image;
      (e2) calculate the first object distance as a ratio of a product of the distance index and the camera distance to a difference between the first image position and the second object image position; and
   (f) calculate an object real size of the object using the first object distance, the second object image, the camera distance, and the distance index, comprising:
      (f1) calculate the object real size as a ratio of a product of the first object image size and the camera distance to a difference between the first object image position and the second object image position.

3. A system, comprising:
   a first camera associated with a distance index, the first camera capturing a first image comprising a first object image of an object;
   a second camera associated with the distance index, the second camera capturing a second image comprising a second object image of the object, the second image captured at approximately a, same time as the first image, wherein the first camera and the second camera are positioned in a side by side manner and facing each other when capturing images; and
   a controller configured to:
   (a) obtain the distance index, a camera distance between the first camera and the second camera;
   (b) receive the first image from the first camera and the second image from the second camera;
   (c) retrieve the first object image in the first image and retrieve the second object image from the second image;
   (d) determine a first object image size of the object in the first object image and determine a second object image size of the object in the second object image;
   (e) calculate a first object distance between the first camera and the object using the distance index, the camera distance, the first object image size, and the second object image size, comprising:
      (e1) calculate the first object distance as a ratio, of a product of the camera distance and the second object image size to a sum of the first object image size and the second object image size; and
   (f) calculate an object real size of the object using the first object distance, the second object image, the camera distance, and the distance index, comprising:
      (f1) calculate the object real size as a ratio of a product of the first object distance, and the first object image size to the distance index.

4. A system, comprising:
   a first camera associated with a distance index, the first camera capturing a first image comprising a first object image of an object;
   a second camera associated with the distance index, the second camera capturing a second image comprising a second object image of the object, the second image captured at approximately a same time as the first image; and
   a controller configured to:
   (a) obtain the distance index, a camera distance between the first camera and the second camera;
   (b) receive the first image from the first camera and the second image from the second camera;
   (c) retrieve the first, object image in the first image and retrieve the second object image from the second image;

(d) determine a first object image size of the object in the first object image and determine a second object image size of the object in the second object image;

(e) calculate a first object distance between the first camera and the object using the distance index, the camera distance, the first object image size, and the second object image size;

(f) calculate an object real size of the object using the first object distance, the second object image, the camera distance, and the distance index;

(g) after a pre-determined timer period, instruct the first camera and the second camera to capture a second set of images of the object;

(h) receive the second set of images of the object from the first camera and the second camera, the second set of images comprising a third image from the first camera comprising a third object image of the object, and a fourth image from the second camera comprising a fourth object image of the object;

(i) retrieve the third object image in the third image and retrieve the fourth object image from the fourth image; and (j) determine a third object image size of the object in the third object image and determine a fourth object image size of the object in the fourth object image;

(k) calculate a second object distance between the first camera and the object at a time the second set of images are captured using the distance index, the camera distance, the third object image size, and the fourth object image size; and (l) calculate an object speed of the object during the time period using the first object distance and the second object distance.

5. A system, comprising:

a first camera associated with a distance index, the first camera capturing a first image comprising a first object image of an object;

a second camera associated with the distance index, the second, camera capturing a second image comprising a second object image of the object, the second image captured at approximately a same time as the first image; and a controller configured to:

(a) obtain the distance index, a camera distance between the first camera and the second camera;

(b) receive the first image from the first camera and the second image from the second camera;

(c) retrieve the first object image in the first image and retrieve the second object image from the second image;

(d) determine a first object image size of the object in the first, object image and determine a second object image size of the object in the second object image;

(e) calculate a first object distance between the first camera and the object using the distance index, the camera distance, the first object image size, and the second object image size;

(f) calculate an object real size of the object using the first object distance, the second object image, the camera distance, and the distance index;

(g) determine whether criteria of a policy are satisfied by at least the first object distance, the policy comprising the criteria and an action associated with the criteria; and (h) when the criteria of the policy are determined to be satisfied by at least the object real size, perform the action associated with the criteria.

6. The system of claim 5, wherein in the determine (e), the controller is further configured to:

(e1) determine whether the criteria of the policy are satisfied by at least the first object distance and the object real size.

7. A method, comprising:

(a) obtaining, by a controller, a distance index associated with a first camera and a second camera and a camera distance between the first camera and the second camera, wherein the first camera and the second camera are positioned in a front-back manners;

(b) receiving, by the controller, a first image captured by the first camera and a second image captured by the second camera at approximately a same time as the first image, the first image comprising a first object image of an object, the second image comprising a second object image of the object;

(c) retrieving, by the controller, the first object image in the first image and retrieve the second object image from the second image;

(d) determining, by the controller, a first object image size of the object in the first object image and determine a second object image size of the object in the second object image;

(e) calculating, by the controller, a first object distance between the first camera and the object using the distance index, the camera distance, the first object image size, and the second object image size, comprising:

(e1) calculating the first object distance as a ratio of a product of the camera distance and the first object image size to a difference between the first object image size and the second object image size; and (f) calculating, by the controller, an object real size of the object using the first object distance, the second object image, the camera distance, and the distance index, comprising:

(f1) calculating the object real size as a ratio of a product of the first object distance and the first object image size to the distance index.

8. A method, comprising:

(a) obtaining, by a controller, a distance index associated with a first camera and a second camera and a camera distance between the first camera and the second camera, wherein the first camera and the second camera are positioned in a front-back manner; wherein the first camera and the second camera are positioned, side by side in a left-right manner or are positioned side by side in a top-bottom manner;

(b) receiving, by the controller, a first image captured by the first camera and a second image captured by the second camera at approximately a same time as the first image, the first image comprising a first object image of an object, the second image comprising a second object image of the object;

(c) retrieving, by the controller, the first object image in the first image and retrieve the second object image from the second image;

(d) determining, by the controller, a first object image size of the object in the first object image and determine a second object image size of the object in the second object image;

(e) calculating, by the controller, a first object distance between the first camera and the object using the distance index, the camera distance, the first object image size, and the second object image size, comprising:

(e1) determining a first object image position of the first object image in the first image and determine a second object image position of the second object image in the second image;

(e2a) calculating the first object distance as a ratio of a product of the distance index and the camera distance to a difference between the first image position and the second object image position; and (f) calculating, by the controller, an object real size of the object using the first object distance, the second object image, the camera distance, and the distance index, comprising:

(f1) calculating the object real size as a ratio of a product of the first object, image size and the camera distance to a difference between the first object image position and the second object image position.

9. A method, comprising:

(a) obtaining, by a controller, a distance index associated with a first camera and a second camera and a camera distance between the first camera and the second camera, wherein the first camera and the second camera are positioned in a side by side manner and facing each other when capturing images;

(b) receiving, by the controller, a first image captured by the first camera and a second image captured by the second camera at approximately a same time as the first image, the first image comprising a first object image of an object, the second image comprising a second object image of the object;

(c) retrieving, by the controller, the first object image in the first image and retrieve the second object image from the second image;

(d) determining, by the controller, a first object image size of the object in the first object image and determine a second object image size of the object in the second object image;

(e) calculating, by the controller, a first object distance between the first camera and the object using the distance index, the camera distance, the first object image size, and the second object image size, comprising:

(e1) calculating the first object distance as a ratio of a product of the camera distance and the second object image size to a sum of the first object image size and the second object image size; and (f) calculating, by the controller, an object real size of the object using the first object distance, the second object image, the camera distance, and the distance index, comprising:

(f1) calculating the object real size as a ratio of a product of the first object distance and the first object image size to the distance index.

10. A method, comprising:

(a) obtaining, by a controller, a distance index associated with a first camera and a second camera and a camera distance between the first camera and the second camera;

(b) receiving, by the controller, a first image captured by the first camera and a second image captured by the second camera at approximately a same time as the first image, the first image comprising a first object image of an object, the second image comprising a second object image of the object;

(c) retrieving, by the controller, the first object image in the first image and retrieve the second object image from the second image;

(d) determining, by the controller, a first object image size of the object in the first object image and determine a second object image size of the object in the second object image;

(e) calculating, by the controller, a first object distance between the first camera and the object using the distance index, the camera distance, the first object image size, and the second object image size;

(f) calculating, by the controller, an object real size of the object using the first object distance, the second object image, the camera distance, and the distance index;

(g) after a pre-determined timer period, instructing the first camera and the second camera to capture a second set of images of the object;

(h) receiving the second set of images of the object from the first camera and the second camera, the second set of images comprising a third image from the first camera comprising a third object image of the object and a fourth image from the second camera comprising a fourth object image of the object;

(i) retrieving the third object image in the third image and retrieve the fourth object image from the fourth image; and (j) determining a third object image size of the object in the third, object image and determine a fourth object image size of the object in the fourth object image;

(k) calculating a second object distance between the first camera and the object at a time the second set of images are captured using the distance index, the camera distance, the third object image size, and the fourth object image size; and (l) calculating an object speed of the object during the time period using the first object distance, and the second object distance.

11. A method, comprising:

(a) obtaining, by a controller, a distance index associated with a first camera and a second camera and a camera distance between the first camera and, the second camera;

(b) receiving, by the controller, a first image captured by the first camera and a second image captured by the second camera at approximately a same time as the first image, the first image comprising a first object image of an object, the second image comprising a second object image of the object;

(c) retrieving, by the controller, the first object image in the first image and retrieve the second object image from the second image;

(d) determining, by the controller, a first object image size of the object in the first object image and determine a second object image size of the object in the second object image;

(e) calculating, by the controller, a first object distance between the first camera and the object using the distance index, the camera distance, the first object image size, and the second object image size;

(f) calculating, by the controller, an object real size of the object using the first object distance, the second object image, the camera distance, and the distance index;

(g) determining whether criteria of a policy are satisfied by at least the first object distance, the policy comprising the criteria and an action associated with the criteria; and (h) when the criteria of the policy are determined to be satisfied by at least the object real size performing the action associated with the criteria.

12. The method of claim 11, wherein the determining (e) comprises:
(e1) determining whether the criteria of the policy are satisfied by at least the first object distance and the object real size.

13. A non-transitory computer readable medium comprising computer readable program code embodied therein, wherein when executed by a controller causes the controller to:
(a) obtain a distance index associated with a first camera and a second camera and a camera distance between the first camera and the second camera, wherein the first camera and the second camera are positioned in a front-back manner;
(b) receive a first image captured by the first camera and a second image captured by the second camera at approximately a same time as the first image, the first image comprising a first object image of an object, the second image comprising a second object image of the object;
(c) retrieve the first object image in the first image and retrieve the second object image from the second image;
(d) determine a first object image size of the object in the first object image and determine a second object image size of the object in the second object image;
(e) calculate a first object distance between the first camera and the object using the distance index, the camera distance, the first object image size, and the second object image size, comprising:
(e1) calculate the first object distance as a ratio of a product of the camera distance and the first object, image size to a difference between the first object image size and the second object image size; and
(f) calculate an object real size of the object using the first object distance, the second object image, the camera distance, and the distance index, comprising:
(f1) calculate the object real size as a ratio of a product of the first object distance and the first object, image size to the distance index.

14. A non-transitory computer readable medium comprising computer readable program code embodied therein, wherein when executed by a controller causes the controller to:
(a) obtain a distance index associated with a first camera and a second camera and a camera distance between the first camera and the second camera, wherein the first camera and the second camera are positioned side by side in a left-right manner or are positioned side by side in a top bottom manner;
(b) receive a first image captured by the first camera and a second image captured by the second camera at approximately a same time as the first image, the first image comprising a first object image of an object, the second image comprising a second object image of the object;
(c) retrieve the first object image in the first image and retrieve the second object image from the second image;
(d) determine a first object image size of the object in the first object image and determine a second object image size of the object in the second object image;
(e) calculate a first object distance between the first camera and the object using the distance index, the camera distance, the first object image size, and the second object image size, comprising:
(e1) determine a first object image position of the first object image in the first image and determine a second object image position of the second object image in the second image;
(e2) calculate the first object distance as a ratio of a product of the distance index and the camera distance to, a difference between the first image position and the second object image position; and
(f) calculate an object real size of the object using the first object distance, the second object image, the camera distance, and the distance index, comprising:
(f1) calculate the object real size as a ratio of a product of the first object image size and the camera distance to a difference between the first object image position and the second object image position.

15. A non-transitory computer readable medium comprising computer readable program code embodied therein, wherein when executed by a controller causes the controller to:
(a) obtain a distance index associated with a first camera and a second camera and a camera distance between the first camera and the second camera, wherein the first camera and the second camera are positioned in a side by side manner and facing each other when capturing images;
(b) receive a first image captured by the first camera and a second image captured by the second camera at approximately a same time as the first image, the first image comprising a first object image of an object, the second image comprising a second object image of the object;
(c) retrieve the first object image in the first image and retrieve the second object image from the second image;
(d) determine a first object image size of the object in the first object image and determine a second object image size of the object in the second object image;
(e) calculate a first object distance between the first camera and the object using the distance index, the camera distance, the first object image size, and the second object image size, comprising:
(e1) calculate the first object distance as a ratio of a product of the camera distance and the second object image size to a sum of the first object image size and the second object image size; and
(f) calculate an object real size of the object using the first object distance, the second object, image, the camera distance, and the distance index, comprising:
(f1) calculate the object real size as a ratio of a product of the first object distance and the first object image size to the distance index.

16. A non-transitory computer readable medium comprising computer readable program code embodied therein, wherein when executed by a controller causes the controller to:
(a) obtain a distance index associated with a first camera and a second camera and a camera distance between the first camera and the second camera;
(b) receive a first image captured by the first camera and a second image captured by the second camera at approximately a same time as the first image, the first image comprising a first object image of an object, the second image comprising a second object image of the object;
(c) retrieve the first object image in the first image and retrieve the second object image from the second image;

(d) determine a first object image size of the object in the first object image and determine a second object image size of the object in the second object image;
(e) calculate a first object distance between the first camera, and the object using the distance index, the camera distance, the first object image size, and the second object image size; and
(f) calculate an object real size of the object using the first object distance, the second object image, the camera distance, and the distance index;
(g) after a pre-determined timer period, instruct the first camera and the second camera to capture a second set of images of the object;
(h) receive the second set of images of the object from the first camera and the second camera, the second set of images comprising a third image from the first camera comprising a third object image of the object and a fourth image from the second camera comprising a fourth object image of the object;
(i) retrieve the third object image in the third image and retrieve the fourth object image from the fourth image; and
(j) determine a third object image size of the object in the third object image and determine a fourth object image size of the object in the fourth object image;
(k) calculate a second object distance between the first camera and the object at a time the second set of images are captured using the distance index, the camera distance, the third object image size, and the fourth object image size; and
(l) calculate an object speed of the object during the time period using the first object distance and the second object distance.

17. A non-transitory computer readable medium comprising computer readable program code embodied therein, wherein when executed by a controller causes the controller to:

(a) obtain a distance index associated with a first camera and a second camera and a camera distance between the first camera and the second camera;
(b) receive a first image captured by the first camera and a second image captured by the second camera at approximately a same time as the first image, the first image comprising a first object image of an object, the second image comprising a second object image of the object;
(c) retrieve the first object image in the first image and retrieve the second object image from the second image;
(d) determine a first object image size of the object in the first object image and determine a second object image size of the object in the second object image;
(e) calculate a first object distance between the first camera and the object using the distance index, the camera distance, the first object image size, and the second object image size; and
(f) calculate an object real size of the object using the first object distance, the second object image, the camera distance, and the distance index;
(g) determine whether criteria of a policy are satisfied by at least the first object distance, the policy comprising the criteria and an action associated with the criteria; and
(h) when the criteria of the policy are determined to be satisfied by at least the object real size, perform the action associated with the criteria.

18. The medium of claim 17, wherein in the determine (e), the controller is further configured to:
(e1) determine whether the criteria of the policy are satisfied by at least the first object distance and the object real size.

* * * * *